(12) United States Patent
Bonk et al.

(10) Patent No.: US 10,106,056 B2
(45) Date of Patent: Oct. 23, 2018

(54) SEAT POSITION-SENSING SYSTEM

(71) Applicant: Faurecia Automotive Seating, LLC, Auburn Hills, MI (US)

(72) Inventors: Jeffery T. Bonk, Chesterfield, MI (US); Dale J. Frye, West Olive, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 21 days.

(21) Appl. No.: 15/298,390

(22) Filed: Oct. 20, 2016

(65) Prior Publication Data

US 2017/0106771 A1    Apr. 20, 2017

Related U.S. Application Data

(60) Provisional application No. 62/243,891, filed on Oct. 20, 2015.

(51) Int. Cl.
  *B60N 2/06* (2006.01)
  *B60N 2/02* (2006.01)

(52) U.S. Cl.
  CPC ........ *B60N 2/06* (2013.01); *B60N 2002/0272* (2013.01)

(58) Field of Classification Search
  CPC ........................ B60N 2/06; B60N 2002/0272
  See application file for complete search history.

(56) References Cited

U.S. PATENT DOCUMENTS

| 7,667,345 B2 | 2/2010 | Budweg |
| 2014/0239689 A1* | 8/2014 | Schebaum ........... B60N 2/0843 297/341 |
| 2016/0101710 A1 | 4/2016 | Bonk |

* cited by examiner

*Primary Examiner* — D Glenn Dayoan
*Assistant Examiner* — Melissa A Black
(74) *Attorney, Agent, or Firm* — Barnes & Thornburg LLP

(57) ABSTRACT

An occupant support for a vehicle includes a vehicle seat and a foundation. The vehicle seat is configured to support an occupant of the vehicle above a floor of the vehicle. The foundation is configured to interconnect the vehicle seat to the floor to permit movement of the vehicle seat relative to the floor along a linear path.

22 Claims, 5 Drawing Sheets

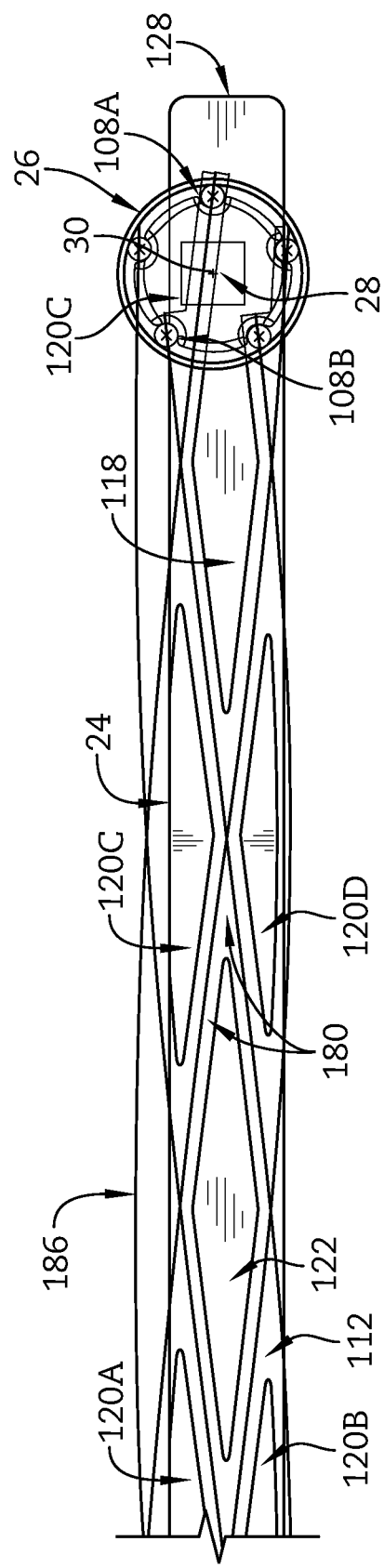

SEAT POSITION-SENSING SYSTEM

PRIORITY CLAIM

This application claims priority under 35 U.S.C. § 119(e) to U.S. Provisional Application Ser. No. 62/243,891, filed Oct. 20, 2015, which is expressly incorporated by reference herein.

BACKGROUND

The present disclosure relates to an occupant support, and particularly to an occupant support included in a vehicle. More particularly, the present disclosure relates to an occupant support including a vehicle seat and a foundation configured to interconnect the vehicle seat to a floor of the vehicle to permit movement of the vehicle seat relative to the floor.

SUMMARY

According to the present disclosure, an occupant support for a vehicle includes a vehicle seat and a foundation. The vehicle seat is configured to support an occupant of the vehicle above a floor of the vehicle. The foundation is configured to interconnect the vehicle seat to the floor to permit movement of the vehicle seat relative to the floor along a linear path.

In illustrative embodiments, the occupant support includes a vehicle seat position-sensing system adapted to determine the position of the vehicle seat along the floor. The vehicle seat position-sensing system includes a guide track, a position wheel, and a sensor. The guide track is coupled to a stationary component of the foundation. The position wheel is coupled to the vehicle seat for movement therewith along the floor and is mounted for rotation relative to the vehicle seat about an axis. The sensor is coupled to the position wheel to move therewith and is configured to provide a signal indicative of the location of the vehicle seat along the floor.

In illustrative embodiments, the position wheel is engaged with the guide track via pins that extend into angled slots formed in the guide track. The pins are configured to cause the position wheel to rotate relative to the vehicle seat in response to linear movement of the vehicle seat along the floor. The sensor may include an accelerometer that provides a signal corresponding to the angular orientation of the position wheel relative to the ground under the vehicle seat. The angular orientation of the position wheel may be used by a controller to determine the location of the vehicle seat along the linear path relative to the floor.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic and perspective view of an occupant support in accordance with the present disclosure showing that the occupant support includes a vehicle seat for supporting an occupant of a vehicle above a floor of the vehicle, a foundation configured to interconnect the vehicle seat to the floor to permit movement of the vehicle seat relative to the floor along a linear path, and a vehicle seat position-sensing system configured to determine the location of the vehicle seat along the linear path relative to the floor, and showing that the vehicle seat position-sensing system includes a guide track coupled to a stationary component of the foundation, a position wheel coupled to a movable component of the foundation, a position wheel mount configured to support the position wheel for rotation about an axis, a sensor coupled to the position wheel to provide a signal indicative of the position of the vehicle seat along the floor, and a controller coupled to the sensor to receive the signal from the sensor and determine the location of the vehicle seat along the linear path;

FIG. 2 is a enlarged side elevation view of a portion of the foundation and the vehicle seat position-sensing system of FIG. 1 showing a position wheel mount coupled to the movable component of the foundation by a bracket, the position wheel includes a round disk and at least one pin coupled to the disk for common rotation with the disk about the axis, and that the at least one pin is configured to contact the guide track to cause the position wheel to rotate about the axis during movement of the vehicle seat along the linear path;

FIG. 3 is an exploded assembly view of the occupant support of FIG. 1 with certain elements omitted for the sake of clarity showing that the guide track is coupled to a rail receiver arranged to couple to the floor to constrain the rail receiver against movement with the vehicle seat relative to the floor, that the bracket is coupled to a movable rail arranged to move with the vehicle seat relative to the floor along the linear path, that the position wheel is engaged with an annular component included in the position wheel mount during movement of the vehicle seat along the linear path, and that the sensor is received by the position wheel during movement of the vehicle seat along the linear path;

Figure 5:
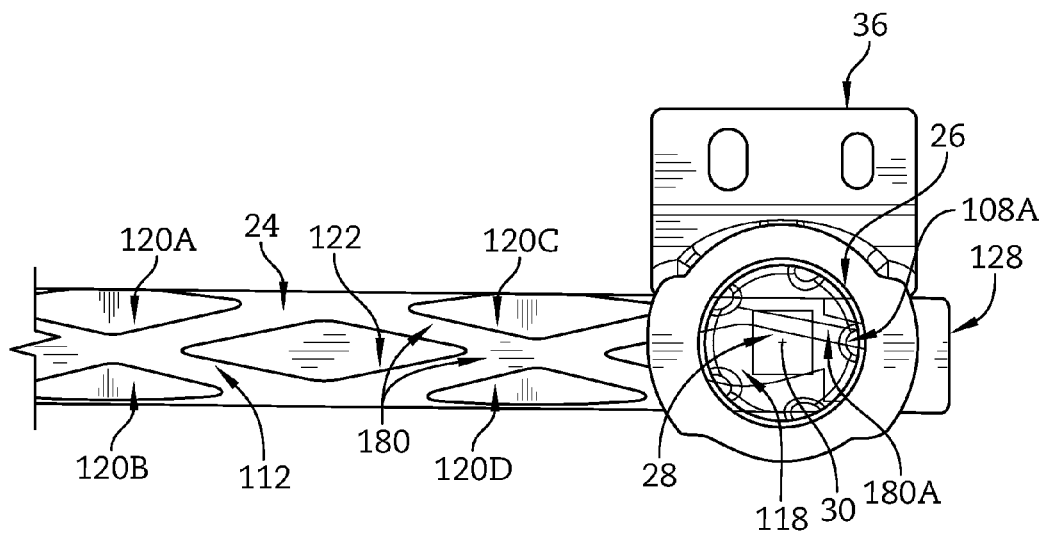
FIG. 5 is an enlarged side elevation view of the vehicle seat position-sensing system of FIG. 1 with certain elements omitted for the sake of clarity showing that the at least one pin of the position wheel is received by at least one slot formed in the guide track and that no movement of the vehicle seat along the linear path has occurred.
Figure 6:
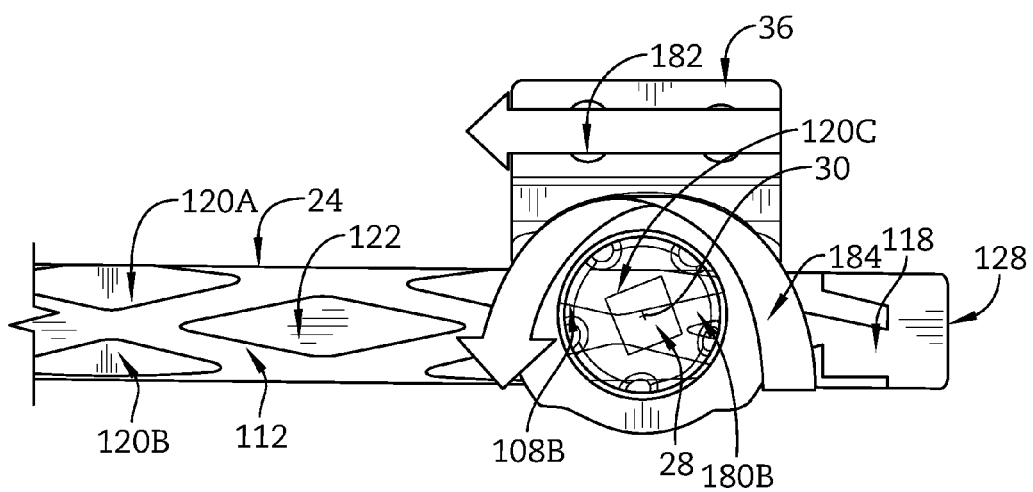

FIG. 6 is a view similar to FIG. 5 showing that movement of the vehicle seat along the linear path has occurred and that such movement causes the at least one pin received in the at least one slot to contact the guide track and drives the position wheel to rotate about the axis; and FIG. 7 is an enlarged side elevation view similar to FIG. 5 showing that the at least one slot extends along at least one curve having a portion defined by the guide track.

DETAILED DESCRIPTION

Figure 1:
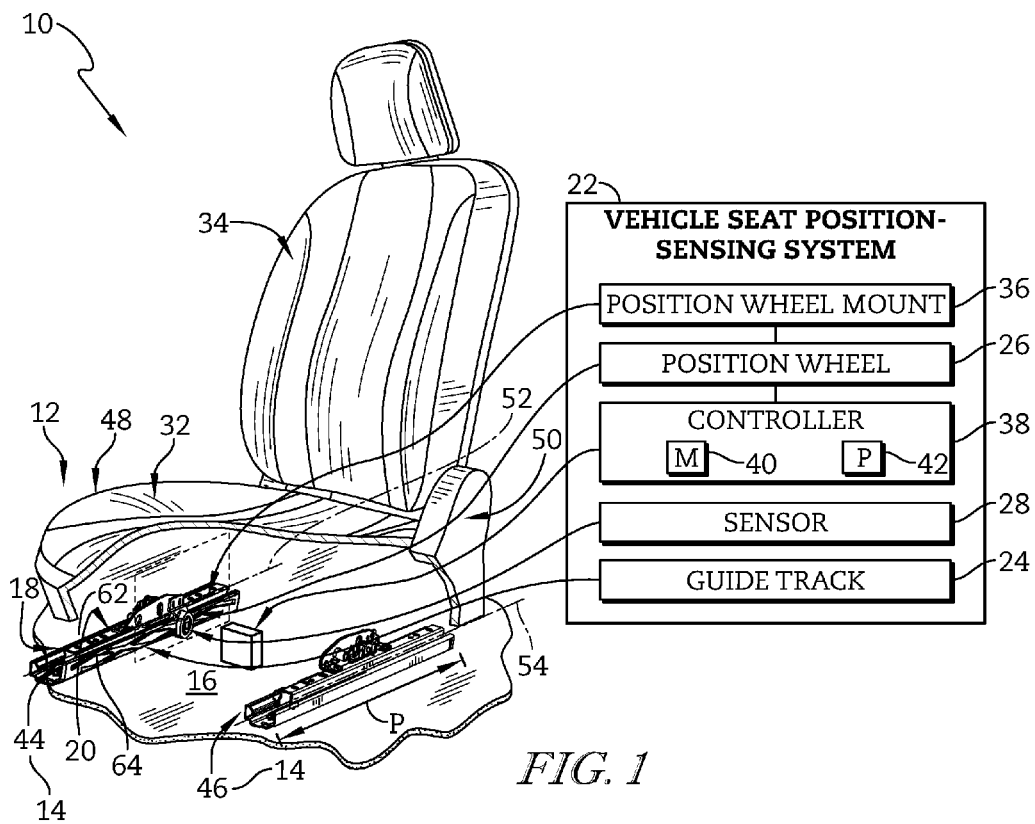

A occupant support 10 configured for use in a passenger vehicle is shown in FIG. 1. Occupant support 10 includes a vehicle seat 12, a foundation 14, and a vehicle seat position-sensing system 22. Vehicle seat 12 is configured to support an occupant of the vehicle about floor 16 of the vehicle. Foundation 14 is configured to interconnect vehicle seat 12 to floor 16 to permit movement of vehicle seat 12 relative to floor 16 along linear path P. When the occupant is supported by vehicle seat 12, movement of vehicle seat 12 relative to floor 16 along path P adjusts the position of the occupant relative to floor 16 and vehicle seat position-sensing system 22 determines the location of vehicle seat 12 along floor 16.

Foundation 14 includes, for example, a stationary rail receiver 18 and a movable rail 20 as shown in FIG. 1. Stationary rail receiver 18 is constrained against movement relative to floor 16. Movable rail 20 is coupled to vehicle seat 12 for movement therewith and mounted to stationary rail receiver 18 for movement along linear path P so that vehicle seat 12 is guided along path P relative to underlying floor 16.

Figure 2:
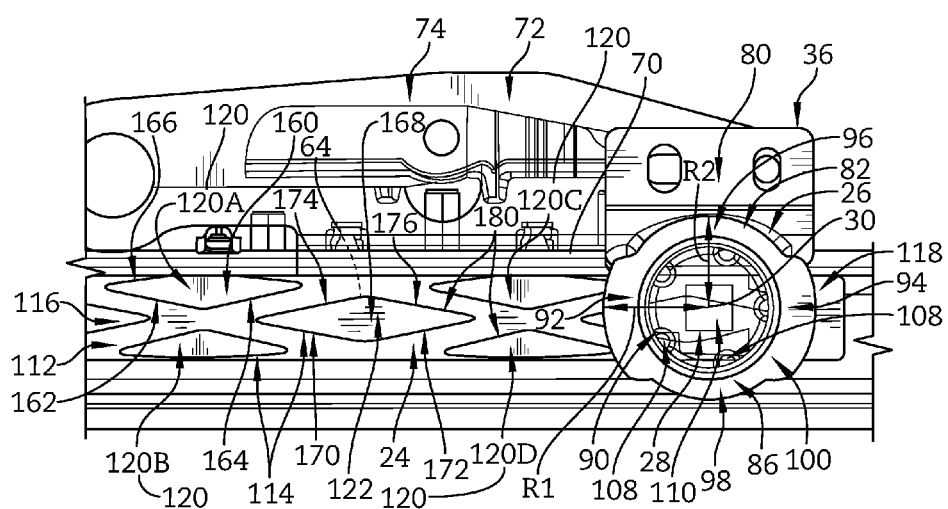
Figure 3:
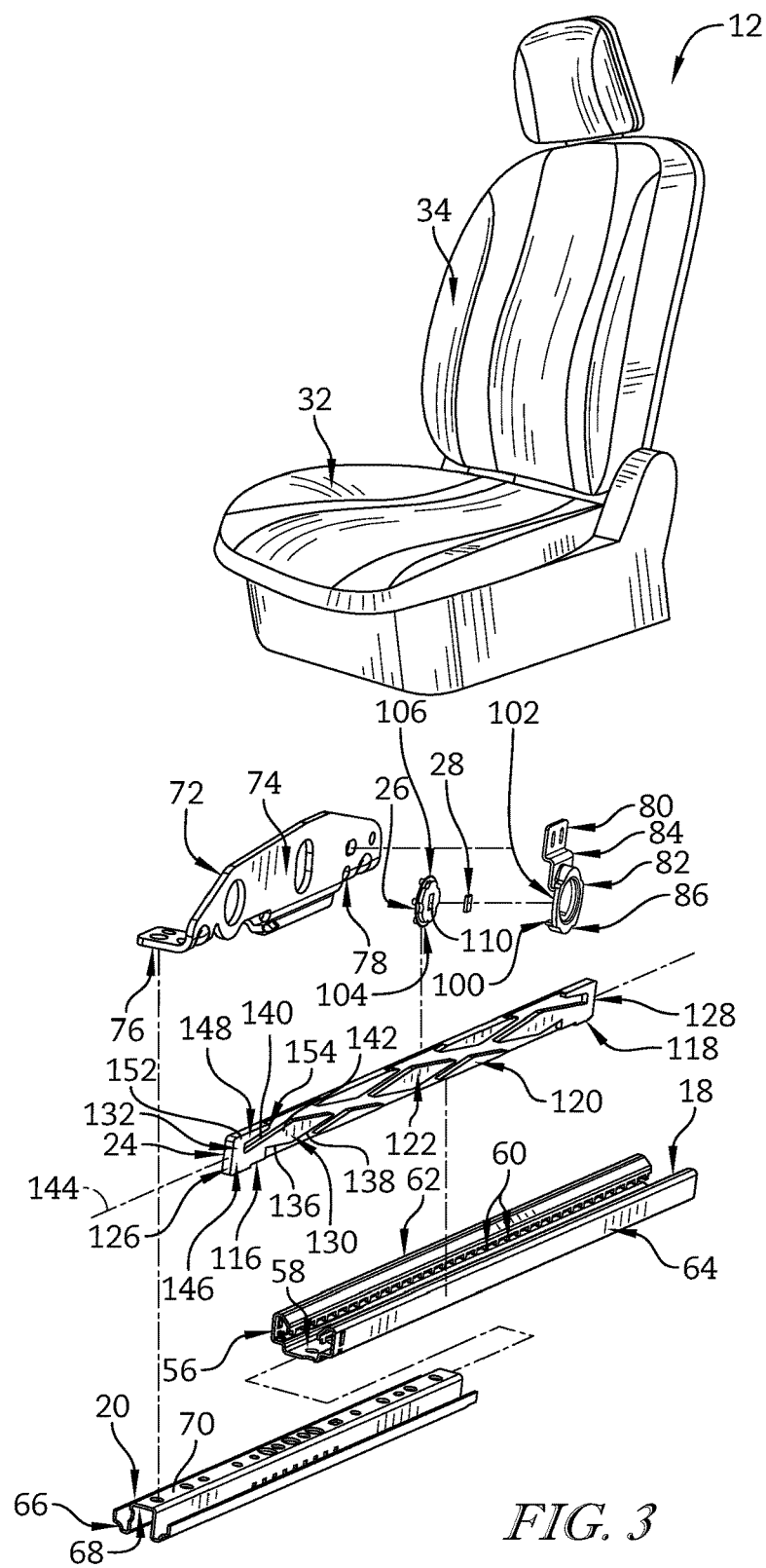

Vehicle seat position-sensing system 22 is used to detect and determine the location of vehicle seat 12 along linear path P relative to floor 16 as suggested in FIGS. 1-3. Vehicle seat position-sensing system 22 includes guide track 24, position wheel 26, and sensor 28. Guide track 24 is coupled to stationary rail receiver 18 of foundation 14. Position wheel 26 is coupled to movable rail 20 of foundation 14 for movement therewith along linear path P and for rotation relative to movable rail 20 about axis 30. Sensor 28 is coupled to position wheel 26 to move therewith and configured to provide a signal indicative of the location of vehicle seat 12 along floor 16.

Figure 4:
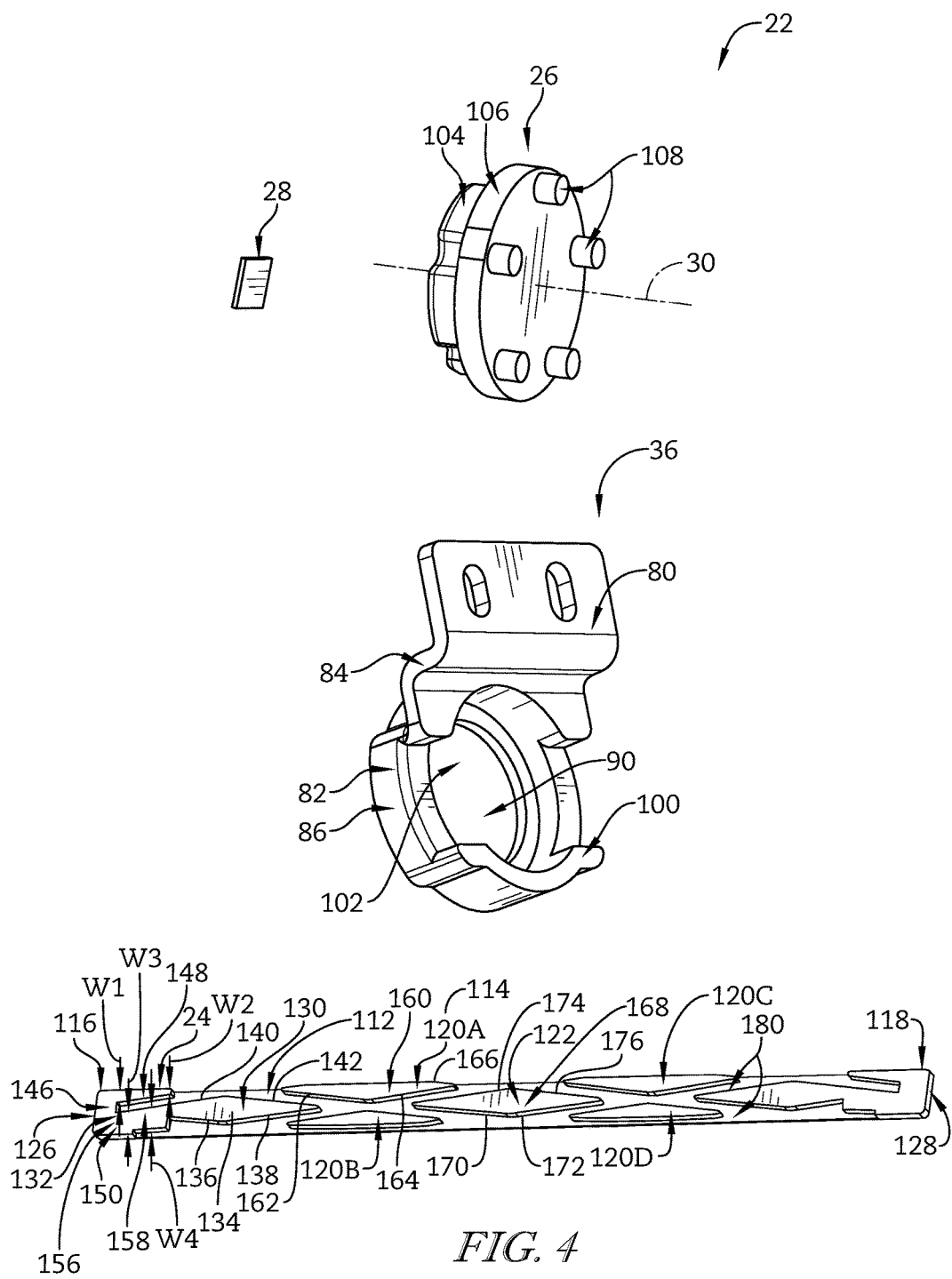
FIG. 4 is an exploded assembly view of several components of the vehicle seat position-sensing system shown in FIGS. 1-3 showing the guide track, the position wheel, the position wheel mount, and the sensor of the vehicle seat position-sensing system of FIGS. 1-3.

Position wheel 26 is engaged with guide track 24 via pins 108 received in slots 180 formed in guide track 24 as shown in FIG. 4. Pins 108 interact with the slots 180 to cause position wheel 26 to rotate relative to movable rail 20 of foundation 14 during linear movement of movable rail 20 and vehicle seat 12 along path P as suggested in FIGS. 5 and 6. As discussed below, the signal from sensor 28 may be used to determine the location of vehicle seat 12 along path P relative to floor 16.

In addition to guide track 24, position wheel 26, and sensor 28, vehicle seat position-sensing system 22 includes position wheel mount 36 and controller 38 as shown in FIG. 1. Position wheel mount 36 is configured to support position wheel 26 for rotation about axis 30 relative to movable rail 20 of foundation 14 during movement of vehicle seat 12 along linear path P. Controller 38 is coupled to sensor 28, and controller 38 includes memory 40 and processor 42. Memory 40 has instructions stored therein that are executable by processor 42 to cause controller 38 to receive the signal from sensor 28 and determine the location of vehicle seat 12 along linear path P based on the signal.

Vehicle seat 12 includes seat bottom 32 and seat back 34 as shown in FIG. 1. Seat bottom 32 is coupled to foundation 14 for movement relative to floor 16 along linear path P. As best seen in FIG. 1, seat bottom 32 is arranged to surround at least a portion of foundation 14 to limit access to foundation 14. Seat back 34 extends upwardly away from seat bottom 32 and is coupled thereto to pivot toward and away from seat bottom 32.

As best seen in FIG. 1, foundation 14 illustratively includes first rail unit 44 and second rail unit 46 that is substantially identical to first rail unit 44. As such, the components included in only first rail unit 44 and the interrelationships between those components are described in detail below. In other embodiments, foundation 14 may include another suitable number of substantially identical rail units.

First rail unit 44 and second rail unit 46 illustratively interconnect floor 16 with opposite sides 48, 50 of seat bottom 32, respectively, as shown in FIG. 1. First rail unit 44 extends along longitudinal axis 52 and second rail unit 46 extends along longitudinal axis 54. Axes 52, 54 are spaced apart from and extend substantially parallel to one another.

As best seen in FIG. 3, first rail unit 44 illustratively includes rail receiver 18 and movable rail 20. Rail receiver 18 is coupled to floor 16 to constrain rail receiver 18 against movement relative to floor 16, and as such, rail receiver 18 is embodied as, or otherwise includes, stationary rail receiver 18. Rail receiver 18 defines longitudinal axis 52. Movable rail 20, sometimes called a movable component, is coupled to seat bottom 32 and arranged to move relative to rail receiver 18 to cause seat bottom 32 to move relative to floor 16.

Rail receiver 18 illustratively includes rail receiver body 56 as shown in FIG. 3. Rail receiver body 56 is formed to include upwardly opening rail-receiver track 58 that defines linear path P. Rail-receiver track 58 is sized to receive movable rail 20 to guide movement of movable rail 20 relative to rail receiver 18 along path P.

Rail receiver body 56 includes outer surfaces 62, 64 arranged opposite one another as shown in FIG. 3. Each of outer surfaces 62, 64 is arranged substantially perpendicular to floor 16 and faces away from rail-receiver track 58. Outer surface 62 faces away from second rail unit 46, whereas outer surface 64 is in confronting relation with second rail unit 46.

In the illustrative embodiment, guide track 24 is coupled to and arranged substantially parallel to outer surface 64 as best seen in FIG. 1. In other embodiments, however, guide track 24 may interact with and be arranged relative to rail receiver 20 in another suitable fashion. For example, guide track 24 may be coupled to and arranged substantially parallel to outer wall 62.

Movable rail 20 illustratively includes rail body 66 as shown in FIG. 3. Rail body 66 is formed to include downwardly opening rail track 68 that is arranged in confronting relation with rail-receiver track 58. Rail body 66 includes an outer surface 70 that faces away from rail track 68 and is arranged substantially parallel to floor 16 and substantially perpendicular to outer surfaces 62, 64 of rail receiver 20.

Position wheel 26 is shown in detail in FIGS. 3 and 4. Position wheel 26 may have a polymeric construction. In other embodiments, however, position wheel 26 may have another suitable construction. For example, position wheel 26 may be constructed of any one or more of the following materials: aluminum, brass, copper, steel, tin, nickel, or titanium. Additionally, position wheel 26 may have a monolithic, one-piece construction or include components formed separately from one another.

Position wheel 26 illustratively includes sensor receiver 104, round disk 106, and pins 108 as shown in FIGS. 3 and 4. Sensor receiver 104 is formed to include aperture 110 that extends there through and is sized to receive sensor 28 during movement of vehicle seat 12 along linear path P. Disk 106 is configured for rotation about axis 30 and is interconnected with sensor receiver 104 and pins 108 so that sensor receiver 104 and pins 108 are coupled for common rotation with disk 106 about axis 30. Pins 108 are arranged to extend outwardly away from disk 106 substantially parallel to axis 30. When position wheel 26 is received by position wheel space 102, a portion of at least one of sensor receiver 104 and disk 106 is positioned in position wheel space 102 and pins 108 are positioned outside of position wheel space 102.

In the illustrative embodiment, pins 108 include five substantially identical cylindrical pins as shown in FIG. 4. The five pins are spaced apart from one another and arranged circumferentially about axis 30 such that each of the pins is spaced the same or substantially the same distance from axis 30. In other embodiments, however, pins 108 may include another suitable number of pins that have another suitable arrangement about axis 30. In any case, at least one of pins 108 is configured to contact guide track 24 to cause position wheel 26 to rotate about axis 30 during movement of vehicle seat 12 along linear path P.

Sensor 28 is illustratively sized to be received by aperture 110 so that sensor 28 is coupled for common rotation with position wheel 26 about axis 30 as shown in FIGS. 3 and 4. Sensor 28 is illustratively embodied as a series of accelerometers configured to provide a signal indicative of the angular orientation of position wheel 26 when position wheel 26 rotates about axis 30 during movement of vehicle seat 12 along linear path P. Reference is hereby made to U.S. Patent Application Publication No. 2016/0101710 filed Oct. 8, 2015 and entitled SEAT POSITION SENSING AND ADJUSTMENT for disclosure relating to use of accelerometers for position sensing in vehicle seat, which application is hereby incorporated in its entirety herein. In other embodiments, however, sensor 28 may be embodied as another suitable device. For example, sensor 28 may be embodied as, or otherwise include, at least one potentiometer, rotary encoder, or the like.

Guide track 24 is shown in detail in FIGS. 3 and 4. In the illustrative embodiment, guide track 24 has a monolithic, one-piece polymeric construction. In other embodiments, however, guide track 24 may have another suitable construction. For example, guide track 24 may be constructed of any one or more of the following materials: aluminum, brass, copper, steel, tin, nickel, or titanium. Additionally, guide track 24 may include components formed separately from one another.

Guide track 24 illustratively includes base 112 and projections 114 as best seen in FIG. 4. Base 112 has a substantially rectangular shape and is coupled to outer surface 64 of rail receiver 20. Projections 114 are interconnected with base 112 and extend outwardly away from base 112 toward second rail unit 46.

Projections 114 illustratively include first end projection 116, second end projection 118, triangular-shaped projections 120, and diamond-shaped projection 122 as shown in FIG. 4. First end projection 116 is located at first end 126 of guide track 24 and second end projection 118 is substantially identical to first end projection 116 and located at second end 128 of guide track 24 that is arranged opposite first end 126. Diamond-shaped projection 122 is located substantially midway between first and second ends 126, 128. Projections 120A, 120B included in triangular-shaped projections 120 extend between first end projection 116 and diamond-shaped projection 122, and the orientation of projection 120B is inverted relative to the orientation of projection 120A. Projections 120C, 120D included in triangular-shaped projections 120 extend between diamond-shaped projection 122 and second end projection 118, and the orientation of projection 120D is inverted relative to the orientation of projection 120C.

First end projection 116 illustratively includes generally diamond-shaped section 130 and section 132 that has a generally U-shaped cross section as shown in FIG. 4. Sections 130, 132 are interconnected with one another. Section 132 is located at first end 126 and section 130 extends away from first end 126 so that at least a portion of section 130 is located between projections 120A, 120B.

Generally diamond-shaped section 130 of first end projection 116 illustratively includes front face 134 and surfaces 136, 138, 140, and 142 as shown in FIG. 4. Front face 134 is interconnected with each of surfaces 136, 138, 140, 142. Surface 136 is interconnected with section 132 and surface 138. Surface 140 is interconnected with section 132 and surface 142 and surface 142 is interconnected with surface 138. Surfaces 136, 142 are arranged opposite one another and surfaces 138, 140 are arranged opposite one another. Each of surfaces 136, 138, 140, 142 is arranged at an angle to longitudinal axis 144 along which guide track 24 extends.

Section 132 of first end projection 116 illustratively includes body 146, upper extension 148, and lower extension 150 as shown in FIG. 4. Body 146 is interconnected with each of extensions 148, 150. Upper extension 148 is positioned above lower extension 150 relative to floor 16 of the vehicle when guide track 24 is coupled to rail receiver 18 as shown in FIG. 1. Upper extension 148 has ends 152, 154 that are arranged opposite one another and have widths W1, W2, respectively. Lower extension 150 has portions 156, 158 that are interconnected with one another and have widths W3, W4, respectively.

Each triangular-shaped projection 120 illustratively includes front face 160 and surfaces 162, 164, 166 as shown in FIG. 4. Front face 160 is interconnected with each of surfaces 162, 164, 166. Surface 162 is interconnected with surface 164 and surface 166. Each of surfaces 162, 164 is arranged at an angle to longitudinal axis 144 and surface 166 is arranged generally parallel to longitudinal axis 144.

Diamond-shaped projection 122 illustratively includes front face 168 and surfaces 170, 172, 174, 176 as shown in FIG. 4. Front face 168 is interconnected with each of surfaces 170, 172, 174, 176. Surface 170 is interconnected with surface 172. Surface 174 is interconnected with surface 170 and surface 176 and surface 176 is interconnected with surface 172. Surfaces 170, 176 are arranged opposite one another and surfaces 172, 174 are arranged opposite one another. Each of surfaces 170, 172, 174, 176 is arranged at an angle to longitudinal axis 144.

Base 112 and projections 114 of guide track 24 illustratively cooperate to define slots 180 as shown in FIGS. 3 and 4. Each of slots 180 is sized to receive one of pins 108 of position wheel 26. During movement of vehicle seat 12 along linear path P, pins 108 are received by slots 180 as position wheel 26 moves along path P such that pins 108 contact projections 114 to cause position wheel 26 to rotate about axis 30.

Slots 180 generally form a diamond pattern as shown in FIGS. 3 and 4. The illustrative diamond pattern configuration of slots 180 is provided to achieve a predetermined degree of rotation of position wheel 26 (i.e., less than or equal to 360 degrees rotation) over the predetermined length of guide track 24 during movement of vehicle seat 12 and position wheel 26 along linear path P. As such, the configuration of slots 180 is specific to the arrangement of pins 108 of position wheel 26.

Slots 180 extend, for example, along curves 186 that have portions defined by guide track 24 as best seen in FIG. 7. During movement of vehicle seat 12 and position wheel 26 along linear path P, each of pins 108 moves along one of curves 186. As such, curves 186 trace the positional state of pins 108 relative to axis 30 during movement of vehicle seat 12 and position wheel 26 along path P.

In the illustrative embodiment, the length of guide track 24 is 300 millimeters. In other embodiments, however, the length of guide track 24 may be another suitable value. In those embodiments, a configuration of slots 180 that is different from the illustrative configuration may be provided to achieve a predetermined degree of rotation of position wheel 26 over the length of guide track 24 during movement of vehicle seat 12 and position wheel 26 along linear path P.

A bracket 72 is illustratively configured to support position wheel 26 and position wheel mount 36 for movement with movable rail 20 and vehicle seat 12 along linear path P as shown in FIG. 3. Bracket 72 illustratively includes bracket body 74 and bracket tabs 76, 78 that are spaced apart from one another and coupled to bracket body 74 as shown in FIG. 4. Bracket tabs 76, 78 are coupled to and arranged parallel to outer surface 70, and bracket body 74 is coupled to position wheel mount 36. Bracket body 74 is arranged generally perpendicular to bracket tabs 76, 78.

Referring now to FIGS. 2-4, position wheel mount 36 is shown in detail. Position wheel mount 36 may have a metallic construction. For example, position wheel mount 36 may be constructed of any one or more of the following materials: aluminum, brass, copper, steel, tin, nickel, or titanium. In other embodiments, however, position wheel mount 36 may have another suitable construction. For instance, position wheel mount 36 may have a polymeric construction. Additionally, position wheel mount 36 may have a monolithic, one-piece construction or include components formed separately from one another.

Position wheel mount 36 illustratively includes bracket engaging tab 80, position wheel receiver 82, and bridge 84 as best seen in FIGS. 3 and 4. Bracket coupling tab 80 is coupled to bracket body 74 and is substantially planar. Position wheel receiver 82 is engaged with position wheel 26 during movement of vehicle seat 12 along linear path P and extends substantially all the way around axis 30. Bridge 84 interconnects bracket engaging tab 80 and position wheel receiver 82 and has a substantially L-shaped cross section.

Position wheel receiver 82 illustratively includes annular ring 86 that is coupled to position wheel 26 as shown in FIG. 4. Annular ring 86 extends substantially all the way around axis 30 and is formed to include bore 90. Annular ring 86 includes arcuate sections 92, 94 arranged opposite one another about axis 30 and each having radius R1 measured from axis 30. Annular ring 86 also includes arcuate sections 96, 98 arranged opposite one another about axis 30 and each having radius R2 measured from axis 30. Sections 92, 94 are interconnected by sections 96, 98, and radius R1 is greater than radius R2.

Position wheel receiver 82 further illustratively includes arcuate platform 100 that is coupled to position wheel 26 as shown in FIG. 4. Platform 100 is interconnected with arcuate section 98 and extends outwardly away from section 98 partway about axis 30.

Annular ring 86 and arcuate platform 100 illustratively cooperate to at least partially define position wheel space 102 that is sized to receive position wheel 26 during movement of vehicle seat 12 along linear path P as shown in FIGS. 3 and 4. When position wheel 26 is received by position wheel space 102, position wheel 26 is cooperatively supported for rotation about axis 30 by ring 86 and platform 100.

Operation of vehicle seat position-sensing system 22 is suggested in FIGS. 5 and 6. Particularly, movement of vehicle seat 12 and position wheel 26 along linear path P is indicated by arrow 182 shown in FIG. 6, and thus rotation of position wheel 26 about axis 30 is indicated by arrow 184.

Position wheel 26 is illustratively positioned at or substantially at second end 128 of guide track 24 as shown in FIG. 5. Pin 108A of pins 108 is received by slot 180A of slots 180 that is defined by base 112 and second end projection 118 such that pin 108A is in contact with projection 118. Because no movement of vehicle seat 12 and position wheel 26 along linear path P has occurred as indicated above, contact between pin 108A and projection 118 has not caused position wheel 26 to rotate about axis 30.

The position of position wheel 26 along guide track 24 as shown in FIG. 5 may be used to establish a reference frame for determining subsequent movement of vehicle seat 12 along linear path P from second end 128. Because no rotation of position wheel 26 about axis 30 has occurred in that position, the signal provided by sensor 28 to controller 38 may be used to establish a baseline angular orientation (i.e., an angular orientation that corresponds to no rotation) of position wheel 26. Additionally, because no movement of vehicle seat 12 and position wheel 26 along path P from second end 128 has occurred in that position, the baseline angular orientation may correspond to a baseline location (i.e., the location of position wheel 26 at end 128) of vehicle seat 12 along path P.

Memory 40 of controller 38 may include instructions that, when executed by processor 42, cause processor 42 to determine the baseline location of vehicle seat 12 along linear path P based on the signal from sensor 28 that establishes the baseline angular orientation of position wheel 26. Based on the illustrative configuration of slots 180, the length of guide track 24 and the predetermined degree of rotation may be stored in memory 40. Using the length of the guide track 24, the predetermined degree of rotation, and the baseline location of vehicle seat 12, processor 42 may determine the location of vehicle seat 12 based on the signal provided thereto by sensor 28 when vehicle seat 12 and position wheel 26 move along path P.

Position wheel 26 is illustratively spaced apart from second end 128 of guide track 24 along linear path P as shown in FIG. 6. During movement of vehicle seat 12 along path P as indicated by arrow 182, position wheel 26 moves along path P such that contact between pin 108A and slot 180A causes position wheel 26 to rotate about axis 30 as indicated by arrow 184. Such rotation is indicated by the signal provided to controller 38 by sensor 28, and the controller 38 may determine the location of vehicle seat 12 along path P based on that signal as indicated above. As position wheel 26 moves along path P, pin 108B of pins 108 is received by slot 180B of slots 180 that is defined by base 112, triangular-shaped projection 120C, and second end projection 118. Further movement of position wheel 26 along path P will cause pin 108 to contact projections 120C and 118 to cause further rotation of position wheel 26 about axis 30.

In the illustrative embodiment, occupant support 10 includes only one vehicle seat position-sensing system 22 as shown in FIG. 1. In other embodiments, however, occupant support 10 may include more than one vehicle seat position-sensing system. In such embodiments, the multiple vehicle seat position-sensing systems may be substantially identical to one another and may provide redundant means for determining the location of vehicle seat 12 along linear path P in the event that a failure is experienced by one of the vehicle seat position-sensing systems.

The invention claimed is:

1. An occupant support for a vehicle, the occupant support comprising
   a vehicle seat adapted to support an occupant of the vehicle above a floor of a vehicle,
   a foundation configured to interconnect the vehicle seat to the floor to permit movement of the vehicle seat relative to the floor along a linear path, the foundation including a stationary component adapted to be constrained against movement relative to the floor and a movable component coupled to the vehicle seat for movement therewith and mounted to the stationary component for movement along the linear path so that the vehicle seat is guided along the linear path relative to the underlying floor, and a vehicle seat position-sensing system including a guide track coupled to the stationary component, a position wheel coupled to the movable component for movement therewith along the linear path and for rotation relative to the movable component about an axis, and a sensor coupled to the position wheel to move therewith and configured to provide a signal indicative of the angular orientation of the position wheel, wherein the position wheel is engaged with the guide track to cause the position wheel to rotate relative to the movable component during movement of the movable component and the vehicle seat along the linear path so that the signal from the sensor may be used to determine the location of the vehicle seat along the linear path relative to the floor.

2. The occupant support of claim 1, wherein the vehicle seat position-sensing system includes a position wheel mount coupled to the movable component to move therewith and configured to support the position wheel for rotation about the axis during movement of the vehicle seat along the linear path.

3. The occupant support of claim 2, wherein the position wheel mount includes an engaging tab coupled to the movable component in a fixed position relative to the movable component and a position wheel receiver coupled to the engaging tab and arranged to extend downwardly away from the movable component toward the stationary component.

4. The occupant support of claim 3, wherein the rotation wheel is located between the position wheel receiver and the guide track and the rotation wheel rotates in rotative bearing engagement with the position wheel receiver relative to the position wheel receiver.

5. The occupant support of claim 4, wherein the position wheel includes a round disk and at least one pin coupled to the disk for common rotation with the round disk, the at least one pin is arranged to extend away from the disk and the position wheel receiver toward the guide track to engage the guide track to cause the position wheel to rotate about the axis during movement of the vehicle seat along the linear path.

6. The occupant support of claim 4, wherein the sensor includes at least one accelerometer.

7. The occupant support of claim 1, wherein the position wheel includes a round disk and at least one pin coupled to the round disk for common rotation with the round disk, the at least one pin is arranged to extend outwardly from the round disk toward the guide track to contact the guide track to cause the position wheel to rotate about the axis during movement of the vehicle seat along the linear path.

8. The occupant support of claim 7, wherein the sensor includes at least one accelerometer coupled to the round disk to move therewith.

9. The occupant support of claim 7, wherein the at least one pin is arranged to extend substantially parallel to the axis away from the disk.

10. The occupant support of claim 9, wherein the guide track is formed to include at least one slot and the at least one slot receives the at least one pin therein.

11. The occupant support of claim 10, wherein the at least one slot generally forms a diamond pattern.

12. The occupant support of claim 11, wherein the sensor includes at least one accelerometer.

13. The occupant support of claim 1, wherein the vehicle seat position-sensing system includes a controller coupled to the sensor and configured to receive the signal from the sensor and determine the location of the vehicle seat along the linear path based on the signal from the sensor.

14. The occupant support of claim 13, wherein the sensor includes at least one accelerometer.

15. The occupant support of claim 1, wherein the stationary component is a rail receiver that includes an upwardly opening rail-receiver track and a rail receiver outer surface arranged to face away from the rail-receiver track and the position wheel guide track is coupled to the rail receiver outer surface.

16. The occupant support of claim 15, wherein the movable component is a rail sized to be received by the rail-receiver track and movable relative to the rail receiver in the rail-receiver track to permit movement of the vehicle seat relative to the floor along the linear path, the rail includes a downwardly opening rail track and a rail outer surface arranged to face away from the rail track and arranged substantially perpendicular to the rail receiver outer surface, and the position wheel is coupled to the rail outer surface.

17. The occupant support of claim 1, wherein the vehicle seat position-sensing system includes a position wheel mount coupled to the movable component to move therewith and configured to support the position wheel for rotation about the axis during movement of the vehicle seat along the linear path, the position wheel mount includes an engaging tab coupled to the movable component in a fixed position relative to the movable component and a position wheel receiver coupled to the engaging tab and arranged to extend downwardly away from the movable component toward the stationary component, and the rotation wheel is located between the position wheel receiver and the guide track.

18. The occupant support of claim 17, wherein the position wheel includes a round disk and at least one pin coupled to the round disk for common rotation with the round disk, the at least one pin is arranged to extend outwardly from the round disk toward the guide track to extend into at one slot formed in the guide track to cause the position wheel to rotate about the axis during movement of the vehicle seat along the linear path.

19. The occupant support of claim 18, wherein the at least one pin consists of five pins spaced apart equally from one another around a perimeter of the round disk.

20. The occupant support of claim 19, wherein the at least one slot consists of a first slot and a second slot and the first and second slots intersect one another establish a series of diamond shaped protrusions and triangle shaped protrusions included in the guide track.

21. The occupant support of claim 18, wherein the sensor consists of an accelerometer.

22. The occupant support of claim 18, wherein the sensor includes a plurality of accelerometers.

* * * * *